United States Patent

[11] 3,593,330

[72] Inventor Donald M. Ackley
Torrance, Calif.
[21] Appl. No. 794,144
[22] Filed Jan. 27, 1969
[45] Patented July 13, 1971
[73] Assignee Computer Communications, Inc.

[54] WEB-LIKE SPRING SUPPORT FOR MAGNETIC TRANSDUCER
8 Claims, 4 Drawing Figs.

Figures 1, 2:
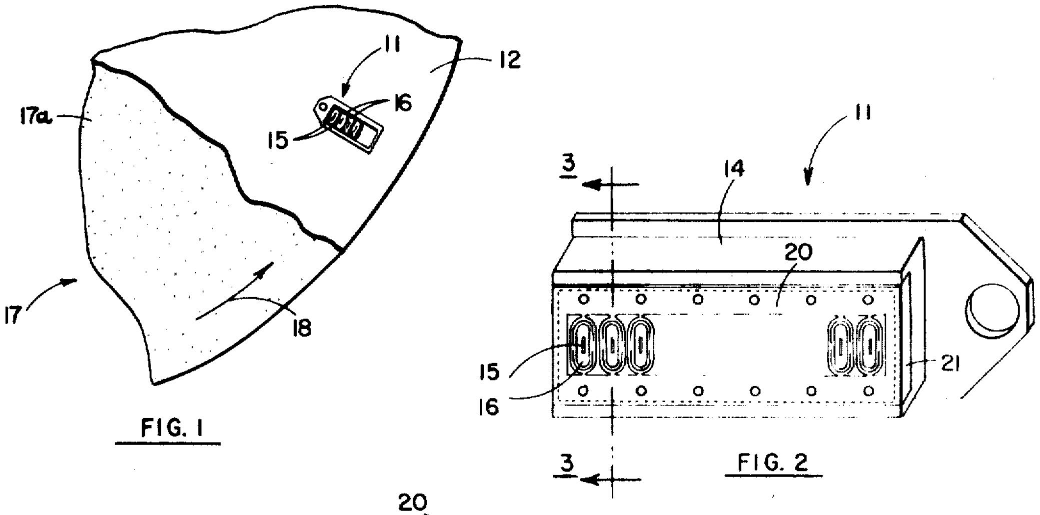

[52] U.S. Cl. ........ 340/174.1, 179/100.2
[51] Int. Cl. ........ G11b 5/60
[50] Field of Search ........ 340/174.1 E, 174.1 F; 179/100.2 P, 100.2 CA

[56] References Cited
UNITED STATES PATENTS
3,310,792 3/1967 Groom et al. ........ 340/174.1

*Primary Examiner*—Bernard Konick
*Assistant Examiner*—Vincent P. Canney
*Attorney*—Sokolski and Wohlgemuth ABSTRACT: A magnetic transducer which operates in conjunction with a magnetic memory disc is resiliently supported in a pair of weblike springs. The transducer is attached to the springs at the opposite ends thereof for motion along an axis perpendicular to the surface of the magnetic memory disc.

INVENTOR.
DONALD M. ACKLEY
BY SOKOLSKI & WOHLGEMUTH
ATTORNEYS

WEB-LIKE SPRING SUPPORT FOR MAGNETIC TRANSDUCER

This invention relates to magnetic memory devices and more particularly to a spring support for a magnetic transducer assembly used in such a device.

In digital computers, magnetic memories are commonly used, having a rotatable magnetic memory disc operating in conjunction with magnetic memory transducers fixed in position proximate to the disc. In this type of device, digital or analog signals may be recorded into the disc by appropriately energizing the magnetic transducer, or conversely, digital or analog signals recorded on the memory disc can be read out through the transducer. Due to the relatively low level of the magnetic signals stored on the disc, it is essential that the transducers be placed very closely proximate thereto, in some instances being continually in contact therewith and in others being separated therefrom by a thin film of air, with physical contact between the disc and the transducer occasionally occurring. To maintain this close proximity, the transducer is generally mounted on the end of a spring in the form of an arm which extends from a fixed mount. With this type of spring mount, the spring arm moves along an arc as the transducer receives impetus from the surface of the disc, i.e., as the surface impels the transducer with its rotation due to surface imperfections, slight surface warpage, and the like. The spring arm of the prior art forms the radius of a circle, and rather than moving in directions perpendicular to the surface of the disc, moves along an arc. It has been found that even a relatively small such arcuate movement relative to the surface of the magnetic memory disc can result in a significant enough shift radially in the relative position between the transducer and the disc, so as to produce a phase shift in the signal which can result in an erroneous reading.

To further explain how these errors are occasioned, let us assume that there is a slight irregularity which has appeared on the surface of the magnetic disc which causes the spring arm to be pushed outwardly when the said surface passes directly beneath the transducer. Due to the outward arcuate motion occasioned by this condition, the electrical signal from the transducer will either lag or advance from its normal clock position. Assuming that the signal on the disc was at the position thereon which would have been opposite the transducer but for the irregularity which has appeared in the surface, a phase shift in the signal read out by the transducer will occur, which could produce an erroneous reading.

The device of this invention overcomes the shortcomings of the above-mentioned prior art spring supports by providing a pair of weblike spring members between which the transducer is supported, the transducer in this support moving along an axis normal to the surface of the disc in response to impetus from the disc surface, and therefore does not read or record a pulse radially displaced from its true clock position. The unique spring support of this invention not only avoids arcuate motion but also resists twisting motion which would also tend to cause signal distortions.

It is therefore the principal object of this invention to provide an improved spring support for magnetic transducer devices which operate in conjunction with a rotating magnetic memory, drum or disc, in which signal distortions are minimized.

Figure 4:
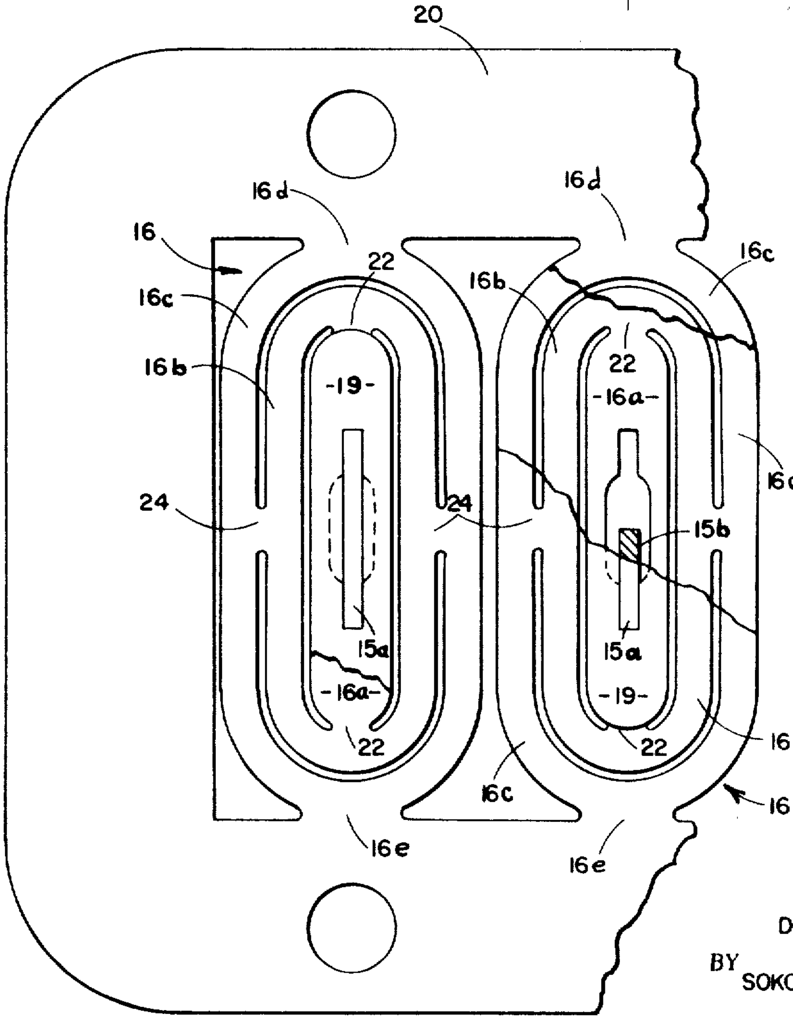
Figure 3:
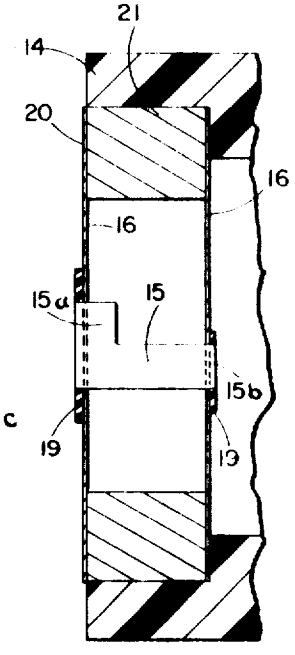

Other objects of this invention will become apparent as the description proceeds in connection with the accompanying drawings, of which:

FIG. 1 is a plan view illustrating a bank of magnetic transducers utilizing the spring supports of the device of the invention, as installed in a magnetic disc memory, FIG. 2 is a perspective view illustrating the bank of transducers shown in FIG. 1, FIG. 3 is a cross-sectional view taken along the plane indicated by 3–3 in FIG. 2, and FIG. 4 is a top plan view illustrating a preferred embodiment of the device of the invention.

Briefly described, the device of the invention comprises a pair of flat weblike spring elements between which a magnetic transducer is resiliently supported. Each weblike spring element has a central section which has the form of a flat strip and which is joined to a second section in the form of an endless band, which is externally concentric therewith, by bridge portions. The second section in turn is joined by bridge portions to a third section, which is in the form of an endless band and is externally concentric with the first and second sections. The third section of the weblike structure is in turn joined to a support structure. In a preferred embodiment of the invention, the bridge portions linking the first section to the second section are located along a first axis, and the bridge portions linking the second section to the third section are located along a second axis normal to the first. The transducer is supported between the central sections of an oppositely positioned pair of spring elements.

Referring now to FIG. 1, a magnetic memory disc device incorporating the spring support of the invention is illustrated. A bank of magnetic transducers 11 is fixedly mounted on a stationary plate member 12. Magnetic transducer bank 11, as more clearly shown in FIGS. 2 and 3, and as to be explained more fully in connection with these figures, comprises a holder unit 14 which has a plurality of magnetic transducers 15 resiliently supported therein between pairs of weblike spring elements 16 (see FIG. 3). The magnetic memory disc 17 is rotated, as indicated by arrow 18, past transducers 15, the magnetically sensitive surface 17*a* of the disc brushing past transducers 15. Magnetic signals are thus either recorded onto the disc from the transducer or read by the transducers from the disc, as the case may be. This general type of magnetic memory device is well known in the art and therefore need not be described in detail here, the invention relating solely to the spring supports for the magnetic transducers.

Referring now to FIGS. 2—4, the details of a preferred embodiment of the device of the invention are illustrated. The magnetic transducers 15 are each supported between a pair of oppositely positioned spring elements 16, as best shown in FIG. 3. One end 15*a* of the transducer is held in the central section 16*a* of one of the pair of spring elements while the opposite end 15*b* of the transducer is held in the central section of the other spring element. The transducer is held to the spring elements by means of plastic portions 19 which are molded to the core and retained in central sections 16*a*. Spring elements 16 are connected to frame 20 at the ends 16*d* and 16*e* thereof. Spring elements 16 and frame 20 may be integrally formed from a strip of resilient metal. Frame 20 is fixedly attached to plate 21 as for example by welding, plate 21 in turn being fixedly supported in holder 14. Spring elements 16 are fabricated of a highly resilient nonmagnetic material such as beryllium copper or stainless steel. while holder 14 is fabricated of either a dielectric material such as a suitable plastic or a metallic material such as aluminum.

The spring elements 16 are flat and have a weblike structure which is formed by a plurality of concentric flat coplanar spring sections 16*a*, 16*b* and 16*c*.

Spring section 16*a* is in the form of an elongated strip and, as already noted, has magnetic transducer 15 attached thereto. Central spring section 16*a* is connected to spring section 16*b* by a pair of bridge portions 22, these bridge portions being placed at opposite ends of the spring section along a common axis. Spring section 16*b* is in the form of an oblong endless band which surrounds section 16*a*.

Spring section 16*b* in turn is joined to spring section 16*c* by oppositely positioned bridge portions 24, which lie along a common axis, such axis being normal to the axis on which bridge portions 22 lie. Spring section 16*c* is similar in configuration to spring section 16*b*, forming an oblong endless band which surrounds section 16*b*.

The magnetic transducer 15 is thus resiliently supported between a pair of spring elements 16 in a manner which only permits motion normal to the surface 17*a* of the magnetic disc when the disc provides an impetus to the transducer. In this manner, signal distortions due to sidewise or arcuate motion of the transducer are minimized. It is to be noted that the spring device of this invention can also be utilized to equal advantage to resiliently support a member for linear motion in satisfying application requirements other than that described herein, such as in a radial direction to position a transducer over or on another track for recording or reading.

I claim:

1. A spring device for resiliently supporting a member for motion along a single axis comprising:

first and second flat weblike spring elements, each of said elements including:

a central spring section in the form of a flat strip, a second spring section in the form of an endless band surrounding said first section and in concentricity therewith, symmetrically arranged bridge portions joining said second section to said first section, a third spring section in the form of an endless band surrounding said second section and in concentricity therewith, symmetrically arranged bridge portions joining said third section to said second section, and means for supporting said third spring section, said pair of spring elements being positioned with their broad surfaces opposite each other in spaced relationship with said member being connected between the central sections of said elements, the broad surfaces of said spring elements being substantially normal to the single axis of motion.

2. The device of claim 1 wherein said means for supporting said third spring section comprises a support frame and bridge portions interconnecting said third section and said frame.

3. The device of claim 1 wherein the bridge portions joining said second section to said first section lie along a first axis and the bridge portions joining said third spring section to said second spring section lie along a second axis normal to said first axis.

4. The device of claim 1 wherein said member is a magnetic transducer, one end of said transducer being attached to one of said spring elements, the other end of said transducer being attached to the other of said spring elements.

5. In a magnetic memory device including a magnetic transducer and a memory disc which is driven past said transducer, the improvement comprising a pair of flat weblike spring elements spaced with their broad surfaces in opposing relationship for resiliently supporting the transducer for motion normal to the surface of the disc, each said spring element including:

a central spring section, a second spring section in the form of an endless band surrounding said central section and in concentricity therewith, bridge portions joining said central section to said second section, a third spring section in the form of an endless band surrounding said second section and in concentricity therewith, bridge portions joining said second section to said third section, means for supporting said third section, said transducer being held between the central sections of said pair of elements for motion solely along a single axis substantially normal to the surface of the disc, and means for positioning said transducer in close proximity to the surface of said disc.

6. The device of claim 5 wherein said supporting means comprises a holder, a frame attached to said holder and bridge portions interconnecting said frame and said third section.

7. The device of claim 5 wherein the bridge portions joining said second section to said first section include a pair of bridge portions which lie along a first axis and the bridge portions joining said second section to said third section comprise a pair of bridge portions which lie along a second axis normal to said first axis.

8. The device of claim 5 wherein said spring sections are oblong.